United States Patent
Commisso

(10) Patent No.: US 10,633,619 B2
(45) Date of Patent: Apr. 28, 2020

(54) METHOD FOR EMBEDDING IMAGES IN SOAP

(71) Applicant: Patrick Commisso, Woodbridge (CA)

(72) Inventor: Patrick Commisso, Woodbridge (CA)

( * ) Notice: Subject to any disclaimer, the term of this patent is extended or adjusted under 35 U.S.C. 154(b) by 141 days.

(21) Appl. No.: 15/916,871

(22) Filed: Mar. 9, 2018

(65) Prior Publication Data
US 2019/0218483 A1    Jul. 18, 2019

(30) Foreign Application Priority Data

Jan. 17, 2018 (CA) ..................................... 2992185

(51) Int. Cl.
| | | |
|---|---|---|
| C11D 17/00 | (2006.01) |
| C11D 17/04 | (2006.01) |
| C08K 5/053 | (2006.01) |
| C08L 3/04 | (2006.01) |
| B41M 1/26 | (2006.01) |
| C11D 13/16 | (2006.01) |
| C08L 3/02 | (2006.01) |
| C11D 13/22 | (2006.01) |
| B41M 5/00 | (2006.01) |

(52) U.S. Cl.
CPC ........... *C11D 17/0095* (2013.01); *B41M 1/26* (2013.01); *C08K 5/053* (2013.01); *C08L 3/02* (2013.01); *C08L 3/04* (2013.01); *C11D 13/16* (2013.01); *C11D 13/22* (2013.01); *C11D 17/04* (2013.01); *B41M 5/0047* (2013.01)

(58) Field of Classification Search
None
See application file for complete search history.

(56) References Cited

U.S. PATENT DOCUMENTS

| | | | |
|---|---|---|---|
| 6,624 | A | 8/1875 | Strunz |
| 1,827,549 | A | 10/1931 | Villain |
| 5,869,437 | A | 2/1999 | Wolfersberger |
| 6,136,764 | A | 10/2000 | Bitton |
| 6,184,191 | B1 | 2/2001 | Wolfersberger |
| 6,652,897 | B1 | 11/2003 | Stewart |
| 6,720,296 | B1 | 4/2004 | Bitton |
| 10,150,939 | B2 * | 12/2018 | Kainen ............... C11D 17/0095 |
| 2006/0016352 | A1 * | 1/2006 | Copland ................. A45D 37/00 |
| | | | 101/114 |
| 2006/0045947 | A1 | 3/2006 | Churnick |
| 2006/0210681 | A1 | 9/2006 | Churnick |
| 2010/0189858 | A1 | 7/2010 | Churnick |
| 2011/0025735 | A1 | 2/2011 | Nohilly et al. |
| 2012/0114802 | A1 | 5/2012 | Langiotti Swank et al. |

FOREIGN PATENT DOCUMENTS

| | | | |
|---|---|---|---|
| EP | 1948771 A2 * | 7/2008 | ........... C11D 17/043 |
| WO | 9835568 | 8/1998 | |

\* cited by examiner

*Primary Examiner* — Necholus Ogden, Jr.
(74) *Attorney, Agent, or Firm* — Saliwanchik, Lloyd & Eisenschenk

(57) ABSTRACT

A method of producing a solid soap containing at least one image embedded within the solid soap includes printing an image on a dissolvable substrate to form an image layer, bringing the image layer into contact with molten soap and allowing the soap to harden so as to embed the image layer within the solid soap. The dissolvable substrate can be a printable icing or frosting sheet and the image can be a high-resolution image. The soap can include a background layer against which the image is visible.

8 Claims, No Drawings

METHOD FOR EMBEDDING IMAGES IN SOAP

CROSS-REFERENCE TO A RELATED APPLICATION

This application claims priority to Canadian Patent Application No. 2,992,185, filed Jan. 17, 2018, which is incorporated herein by reference in its entirety.

BACKGROUND

The present application is directed to a method of embedding an image into soap. More specifically, the present application relates to a method for embedding a high-resolution image layer into solid soap.

Soaps containing one or more embedded images may be useful for advertising, souvenirs, decoration, or a variety of other novelty purposes. However, images located on the exterior surface of the soap might quickly deteriorate or disappear as the soap is used and gradually dissolved. In contrast, images embedded into the interior of soap can be protected from conditions that could damage or erode the image and thus may provide a longer-lasting experience to the user. For example, an image embedded in a transparent or translucent bar of soap may remain visible to the user until the soap has been almost completely used. Alternatively, an image embedded in an opaque bar of soap may remain hidden until gradual dissolution of the soap during use exposes the image. In such a case, for example, the exposed image may reveal an advertising message such as "Time to replace the [specific brand of] soap", or any other desired message or image.

Methods of embedding images into soap are described in U.S. Pat. Nos. 6,720,296; 6,184,191; 6,136,764; 5,869,437; 1,827,549; and RE6624. However, embedding soap with a solid image-bearing substrate such as plastic or cardboard can result in injury or discomfort to the user if the plastic or cardboard substrate is exposed as the soap wears away during use. In addition, known methods can result in images which are blurry, of low definition or otherwise poor quality, or which may bleed into the surrounding soap.

Thus, new methods are desirable for producing soap with one or more dissolvable embedded images having one or more of the following characteristics: high-quality, multicolour, long-lasting, crisp, robust, and resistant to degradation or bleeding over time.

SUMMARY

The present application provides a method for preparing a solid soap containing at least one embedded image. The method includes printing a printed image on a dissolvable substrate to form an image layer, wherein the dissolvable substrate is printable at high-resolution, bringing the image layer into contact with molten soap, and allowing the molten soap to harden so as to embed the image layer within the solid soap. In at least one embodiment, the printed image is a high-resolution image. In at least one embodiment, the printed image is a photo-quality image. In at least one embodiment, the printed image is a three-dimensional image.

In at least one embodiment, the dissolvable substrate is a dried paste comprising water, one or more starches, starch sources or modified starches, one or more sugars or sugar sources, oil or fat, at least one emulsifier and at least one stabilizer. In at least one embodiment, the dried paste further comprises one or more components selected from a polyhydric alcohol, a preservative, a flavouring agent, a colouring agent and an opacifying agent. In at least one embodiment, the dissolvable substrate is a printable icing or frosting sheet.

In another aspect, the present application provides the use of an image layer as described herein for preparing a solid soap containing at least one embedded image. A further aspect provides a solid soap containing at least one embedded image prepared by the method described herein.

DEFINITIONS

As used herein, the terms "about" or "approximately" as applied to a numerical value or range of values are intended to mean that the recited values can vary within an acceptable degree of error for the quantity measured given the nature or precision of the measurements, such that the variation is considered in the art as equivalent to the recited values and provides the same function or result. For example, the degree of error can be indicated by the number of significant figures provided for the measurement, as is understood in the art, and includes but is not limited to a variation of ±1 in the most precise significant figure reported for the measurement. Typical exemplary degrees of error are within 20 percent (%), preferably within 10%, and more preferably within 5% of a given value or range of values. Numerical quantities given herein are approximate unless stated otherwise, meaning that the term "about" or "approximately" can be inferred when not expressly stated.

As used herein, the term "substantially" refers to the complete or nearly complete extent or degree of an action, characteristic, property, state, structure, item, or result. For example, an object that is "substantially" in a given position including but not limited to vertical, horizontal, or adjacent to or aligned with another object, would mean that the object is either completely in that position or nearly completely in that position. The exact allowable degree of deviation from absolute completeness may in some cases depend on the specific context. However, generally speaking the nearness of completion will be so as to have the same overall result as if absolute and total completion were obtained.

The use of "substantially" is equally applicable when used in a negative connotation to refer to the complete or near complete lack of an action, characteristic, property, state, structure, item, or result. For example, an image that undergoes "substantially no" degradation would either completely lack degradation, or so nearly completely lack degradation that the effect would be the same as if it completely lacked degradation. In other words, an image that undergoes "substantially no" degradation may still actually undergo some minor degradation as long as there is no measurable or significantly noticeable effect thereof.

As used herein, terms indicating relative direction or orientation, including but not limited to "upper", "lower", "top", "bottom", "vertical", "horizontal", "outer", "inner", "front", "back", and the like, are intended to facilitate description of the present invention by indicating relative orientation or direction in usual use, and are not intended to limit the scope of the present invention in any way to such orientations or directions.

DETAILED DESCRIPTION

The present application provides a method for preparing a solid soap containing at least one embedded image. As used herein, the term "solid soap" is intended to refer to soap which is in a solid state when at room temperature. As used herein, the term "soap" is intended to refer to alkali metal salts of fatty acids, including but not limited to sodium and potassium salts of fatty acids, and formulations containing such alkali metal salts of fatty acids. Fatty acids include but are not limited to saturated and unsaturated$_{C12-18}$ alkanoic acids, including but not limited to lauric acid, myristic acid, palmitic acid, stearic acid, oleic acid, linoleic acid, and linolenic acid.

The soap may be in any solid form, including but not limited to slabs, sheets, or individual bars or cakes which are round, rectangular, oval, or any other shape which can be produced with a mold, by cutting from a slab or sheet, by three-dimensional printing, or by other suitable methods known in the art. The individual bars or cakes can be of any size convenient for use, including but not limited to soap sheets, soap leaves, hotel-size soaps, guest soaps, standard personal-size soap bars and laundry-size soap bars, as will be understood by the skilled person. In embodiments, the amount of soap in the individual bar or cake can range from about 1 gram or less to about 450 grams or more, and the dimensions of the individual bar or cake can range from about 1 mm or less to about 8 cm or more in thickness and from about 2 cm or less to about 15 cm or more in one or more of length, width or diameter. In at least one embodiment, the soap can be a large slab or sheet having a mass of up to several hundred kilograms or more and having dimensions up to several meters, from which individual bars or cakes can be cut. Such large slabs or sheets can be prepared during manufacture of the soap, or for promotional purposes, and the individual bars or cakes can be cut and provided to customers on demand. The person of skill in the art would be aware of other possible configurations of the present solid soap having other possible dimensions and amounts of soap.

The soap may be transparent, translucent, or opaque. Suitable soap formulations may include natural and synthetic additives, including but not limited to detergents, surfactants, glycerol or glycerin, oils or fats, emollients, exfoliants, colours, fragrances, antimicrobial agents, decorative elements and other additives well known in the art. Suitable soaps and soap formulations are commercially available or can be readily made by known procedures, including but not limited to saponification of oils and fats by reaction with strong bases, including but not limited to sodium hydroxide or lye.

The method includes printing an image on a dissolvable substrate to form an image layer. As used herein, the term "image" is intended to refer to any two-dimensional graphical representation. This may include, but is not limited to, photographs, drawings, illustrations, text matter or other graphical depictions, and can be in black and white or in one or more colours. Suitable images can be produced on or applied to a surface using any suitable methods known in the art, including but not limited to ink jet printing, xerography, gravure, screen printing, or other methods which are known in the art. The image can be of any size suitable for the size of the soap into which the image will be embedded such that it is visible to a user of the soap, as will be understood in the art.

In at least one embodiment, the image is a high-resolution image. Thus, the dissolvable substrate is capable of being printed with a high-resolution image, although an image selected for embedding in the solid soap need not be a high-resolution image. As used herein, the term "high-resolution image" is intended to refer to a colour or black and white image printed by a high-resolution printer. A suitable high-resolution printer is capable of printing with a print resolution of at least 150 dots per inch (dpi), or of at least 300 dpi, and may be capable of printing with a print resolution of up to 2400 dpi or up to 4800 dpi or up to 9600 dpi or higher. The printer can be capable of printing the image using any suitable printing process known in the art, including but not limited to three-colour process, four-colour process, monotone or spot colour.

In at least one embodiment, the image is a photo-quality image. As used herein, the term "photo-quality image" is intended to refer to a high-resolution image in full colour, such that the photo-quality image is substantially similar to a full colour photographic image when viewed.

In at least one embodiment, the image or high-resolution image is a three-dimensional image. As used herein, the term "three-dimensional image" is intended to mean a two-dimensional image that can be printed on a dissolvable substrate as described herein, but which gives a visual impression of depth in a third dimension. Examples of three-dimensional images include but are not limited to stereoscopic images and holographic images in addition to images, including but not limited to high-resolution images, which have a composition and/or quality which gives a visual impression of depth in a third dimension.

The dissolvable substrate is printable at high-resolution to form the image layer. As used herein, the term "printable at high-resolution" is intended to refer to the ability to be printed with a high-resolution image such that the resulting printed image substantially retains the degree of resolution at which the high-resolution image is printed. In at least one embodiment, when an image, including but not limited to a high-resolution image, a photo-quality image or a three-dimensional image, has been embedded in the solid soap according to the present method, the embedded image is advantageously resistant to at least one of bleeding, blurring and degradation. In at least one embodiment, the image remains crisp and clear with substantially no or only minimally detectable degradation, bleeding or blurring for a period of at least 6 months, or at least 1 year, or at least 3 years, or at least 5 years.

In at least one embodiment, the dissolvable substrate comprises a solid paste comprising water, one or more starches, starch sources or modified starches, one or more sugars or sugar sources, oil or fat, at least one emulsifier and at least one stabilizer. In at least one embodiment the one or more starches, starch sources or modified starches include but are not limited to one or more of corn starch, tapioca starch, glutinous rice, distarch phosphate, acetylated distarch adipate, and maltodextrin. In at least one embodiment, the one or more sugars or sugar sources include but are not limited to one or more of sugar, glucose, dextrose, fructose, sucrose, corn syrup solids and corn syrup. In at least one embodiment, the oil or fat is an edible oil or fat, including but not limited to a vegetable oil or hydrogenated coconut fat. In at least one embodiment, the emulsifier includes but is not limited to a monoglyceride of a fatty acid, a diglyceride of a fatty acid, a sorbitan ester and a polysorbate nonionic surfactant. In at least one embodiment, the sorbitan ester includes but is not limited to sorbitan monostearate. In at least one embodiment, the polysorbate nonionic surfactant includes but is not limited to one or more of polyoxyethylene sorbitan tristearate, polysorbate, polysorbate 60 and polysorbate 80. In at least one embodiment, the stabilizer is one or more of a gum and cellulose. In at least one embodiment, the gum includes but is not limited to gum arabic and acacia gum. In at least one embodiment, the cellulose includes but is not limited to microcrystalline cellulose.

In at least one embodiment, the dissolvable substrate further contains a polyhydric alcohol, including but not limited to one or more of glycerol, glycerin and sorbitol. Other ingredients well known in the art may also be present in the dissolvable substrate, including but not limited to preservatives, flavouring agents, colouring agents and opacifying agents. Suitable preservatives include but are not limited to citric acid, sorbitol and potassium sorbate. Suitable flavouring agents include but are not limited to artificial sweeteners, and well-known flavouring agents, including but not limited to vanilla flavouring. Suitable artificial sweeteners include but are not limited to sucralose. Suitable colouring agents include but are not limited to food grade colouring agents. Suitable opacifying agents include but are not limited to titanium dioxide.

In at least one embodiment, the dissolvable substrate comprises a solid paste comprising water, cornstarch, glutinous rice, glucose, sugar, vegetable oil, arabic gum, polysorbate 60, citric acid and vanilla flavouring. In at least one embodiment, the dissolvable substrate comprises a solid paste comprising water, corn starch, corn syrup, corn syrup solids, cellulose, sorbitol, glycerin, sugar, vegetable oil, gum arabic, polysorbate 80, vanilla, titanium dioxide and citric acid. In at least one embodiment, the dissolvable substrate comprises a solid paste comprising starches (distarch phosphate, acetylated distarch adipate), maltodextrin, glycerin, sugar, water, acacia gum, microcrystalline cellulose, dextrose, emulsifiers (polyoxyethylene sorbitan tristearate, mono and diglycerides of fatty acids, sorbitan monostearate), titanium dioxide, sucralose, citric acid, flavours, preservative (potassium sorbate) and hydrogenated coconut fat. In at least one embodiment, the dissolvable substrate comprises a solid paste comprising tapioca starch, corn syrup, corn syrup solids, cellulose, purified water, sugar, vegetable oil, polysorbate, gum arabic, citric acid, sorbitol, glycerine, titanium dioxide and vanilla.

In at least one embodiment, the dissolvable substrate comprises a dried paste comprising:
a) a first base composition comprising 6.4% modified corn starch, 0.4% citric acid, 24.5% sugar, and 68.7% corn syrup solids by weight;
b) a second base composition comprising 75.2% corn syrup, 2.3% titanium dioxide, and 22.5% gum Arabic by weight;
c) a forming composition comprising 9.1% polysorbate 80, 11.4% glycerin, and 79.5% vegetable oil by weight; and
d) a solidifying composition comprising 29.2% microcrystalline cellulose, 68.7% cornstarch; 0.9% sodium hydroxide and 1.2% clear vanilla flavor by weight.

The dried paste can be prepared using a procedure described in one or more of US 2010/0189858, US 2006/0210681, and US 2006/0045947. In at least one embodiment, the dissolvable substrate comprises a solid paste comprising 26% tapioca starch, 24% corn syrup, 14% corn syrup solids, 11% cellulose, 10% purified water, 6% sugar, 2% vegetable oil, 1% polysorbate, and less than 1% each of gum arabic, citric acid, sorbitol, glycerine, titanium dioxide and vanilla.

In at least one embodiment, the dissolvable substrate is disposed on a removable backing layer as described in one or more of US 2010/0189858, US 2006/0210681, and US 2006/0045947. The backing layer can be any material which provides support to the dissolvable substrate, including but not limited to during printing of the image on the dissolvable substrate, and should be a material from which the dissolvable substrate can be removed without causing damage to the dissolvable substrate or to any image printed thereon. Materials suitable for the removable backing layer are known in the art and include but are not limited to plastics.

In at least one embodiment, the dissolvable substrate is a printable edible icing or frosting sheet which can be used for decorating foodstuffs such as baked goods, desserts and confectionery. Suitable edible icing or frosting sheets are sold or manufactured commercially by suppliers including but not limited to PhotoFrost, Kopykake Enterprises, Inkedibles, and Edible Image Supplies.

The image is printed on the dissolvable substrate using inks that are safe for contact with human skin. In at least one embodiment, the image is printed on the dissolvable substrate using edible inks that are safe for human consumption. In at least one embodiment, the inks comprise one or more dyes or colorants in a carrier comprising water and one or more co-solvents or humectants. In at least one embodiment, the dyes or colorants are food grade dyes or colorants, including but not limited to Brilliant Black BN (E151), azorubine (E122), Ponceau 4R (E124), erythrosine (FD&C Red #3; E127), Allura Red AC (FD&C Red #40; E129), Brilliant Blue FCF (FD&C Blue #1; E133), tartrazine (FD&C Yellow #5; E102), Quinoline Yellow WS (E104) and Sunset Yellow FCF (FD&C Yellow #6; E110). In at least one embodiment, the co-solvent or humectant includes but is not limited to ethanol, grain alcohol, propylene glycol and glycerin. Other agents such as preservatives, biocides, fungicides, buffering agents, fixatives, penetrants, surfactants, and resins may also be present. In at least one embodiment, the preservative includes but is not limited to one or more of propylene glycol, citric acid and methylparaben. Suitable inks are described in one or more of US 2010/0189858, US 2006/0210681, and US 2006/0045947, or are sold commercially as edible inks or inks otherwise safe for contact with human skin or as inkjet printer-compatible cartridges containing such edible inks or inks otherwise safe for contact with human skin, by suppliers including but not limited to PhotoFrost, Kopykake Enterprises, Inkedibles, and Edible Image Supplies.

In at least one embodiment, the image is printed on the dissolvable substrate using an inkjet printer containing suitable inks as described herein. In at least one embodiment, the inkjet printer is a high-resolution printer. Suitable inkjet printers include but are not limited to a printer as described in US 2011/0025735 and Epson™ and Canon™ inkjet printer models which can accept inkjet printer-compatible cartridges containing suitable inks as described herein. In at least one embodiment, the inkjet printer is a large format inkjet printer, including but not limited to a flatbed printer.

The method further includes bringing the image layer into contact with molten soap and allowing the soap to harden so as to embed the image layer within the solid soap. The molten soap can be produced by any method known in the art, including but not limited to melting a solid soap base using any convenient heating method. Suitable heating methods include but are not limited to microwaving the soap or heating the soap over hot water or steam.

When the molten soap is brought into contact with the image layer, the molten soap can be at any temperature above its melting point at which the viscosity of the molten soap permits the molten soap to flow and spread so as to coat the image layer, but that is low enough to avoid damage to the dissolvable substrate due to contact with the molten soap and to avoid damage to the soap itself. In view of the teaching herein, the person of skill in the art will be readily able to determine a suitable temperature at which a particular formulation of soap can be brought into contact with an image layer. In at least one embodiment, the molten soap is at a temperature between about 40° C. and about 100° C. In at least one embodiment, the molten soap is at a temperature between about 40° C. and about 95° C.

In at least one embodiment, the image layer is coated with a dissolvable coating prior to being brought into contact with the molten soap. In at least one embodiment, the dissolvable substrate is coated with a dissolvable coating and one or more images are printed on the dissolvable substrate precoated with the dissolvable coating to form the coated image layer. In at least one embodiment, the dissolvable substrate is printed with one or more images prior to being coated with the dissolvable coating to form the coated image layer. In at least one embodiment, the dissolvable coating includes but is not limited to one or more of shellac and a dissolvable plastic, including but not limited to polylactic acid, polyglycolic acid and polyvinylalcohol. Other suitable dissolvable coatings are known or can be prepared by a person skilled in the art.

In at least one embodiment of the present process, the image layer is encased in soap to form a soap-encased image layer. In at least one embodiment, molten soap is applied to the image layer and allowed to harden. In at least one embodiment, molten soap is applied by pouring the molten soap onto one side of the image layer. In at least one embodiment, the amount of molten soap poured onto the image layer is at least the minimum necessary to entirely cover the image layer so as to form a coherent and stable solid soap layer in contact with the image when the soap hardens. However, the amount of molten soap can be chosen to form a thicker solid soap layer on the image layer. In at least one embodiment, when the soap layer applied to the image layer has hardened, molten soap is poured onto the reverse side of the image layer and allowed to harden so as to encase the image layer in solid soap. In embodiments in which the image layer has a removable backing layer as described herein, molten soap can be first applied to the exposed side of the image layer and allowed to harden, then the removable backing layer can be removed to expose the reverse side of the image layer, and molten soap can be applied to the exposed reverse side of the image layer so as to encase the image layer in solid soap. The soap-encased image layer can be cut to a desired shape and size.

In at least one embodiment, the image layer or the soap-encased image layer can be applied to a base layer of solid soap. In at least one such embodiment, the base layer can be prepared by pouring molten soap into a mold so as to partially fill the mold, and allowing the molten soap to harden to form the base layer. The base layer can be a sheet or slab of soap, or can be molded into individual bars or cakes. In at least one embodiment, the base layer can be prepared by three-dimensional printing using a molten soap.

The image layer or the soap-encased image layer is adhered to the base layer by pouring an adhering layer of molten soap onto the base layer, placing the image layer or the soap-encased image layer on the adhering layer of molten soap, and allowing the adhering layer of molten soap between the base layer and the image layer or soap-encased image layer to harden. In at least one embodiment, the adhering layer of molten soap contains sufficient molten soap to intimately and strongly adhere the image layer or the soap-encased image layer to the base layer, as will be understood in the art.

In at least one embodiment, a background layer can be disposed on the dissolvable substrate to form part of the image layer. The background layer can be opaque and/or coloured. In at least one embodiment, the background layer is a white, opaque layer comprising titanium dioxide. In at least one embodiment, the background layer can be printed on the dissolvable substrate by methods known in the art including, but not limited to, block printing. In at least one embodiment, when a background layer has been disposed on the dissolvable substrate, the image is printed on the background layer, such that the image is apparent against the background layer. In at least one embodiment, a first image is printed on the dissolvable substrate, a background layer is disposed on the printed dissolvable substrate and a second image is printed on the background layer. In this way, a two-sided image can be produced, in which the first image is apparent against a first side of the background layer and the second image is apparent against a second side of the background layer, wherein the second side of the background layer is opposite to the first side of the background layer. In at least one embodiment of such a two-sided image, the background layer is opaque, such that only one of the two images would be apparent when viewing each side of the background layer.

In at least one embodiment, a background layer can be disposed on the base layer of soap before the image layer is adhered. In at least one embodiment, the background layer can be printed on the soap base. In at least one embodiment, the background layer is formed by pouring a layer of molten opaque soap on the soap base and allowing the molten opaque soap to harden. In such embodiments, the image layer can be adhered to the hardened layer of opaque soap as described herein.

In at least one embodiment, one or more additional image layers or soap-encased image layers or background layers as described herein can be layered on an image layer or soap-encased image layer or background layer already adhered to the base layer, so as to embed a multi-layer image into the solid soap. In at least one embodiment, a background layer can be layered on a previously adhered image layer or soap-encased image layer by printing or by pouring a layer of molten opaque soap over the previously adhered image layer or soap-encased image layer as described herein. In at least one embodiment, an additional adhering layer of molten soap is added to the previously adhered image layer or soap-encased image layer or background layer, the additional image layer or soap-encased image layer is placed in contact with the adhering layer of molten soap, and the adhering layer is allowed to harden to intimately and strongly adhere the additional image layer or soap-encased image layer to the previously adhered image layer or soap-encased image layer or background layer. The process can be repeated until all desired additional image layers or soap-encased image layers or background layers have been adhered to form the multi-layer image. In at least one embodiment, an intermediate layer of molten soap of varying thickness may be poured over a previously adhered image layer or soap-encased image layer or background layer and allowed to harden before adhering an additional image layer or soap-encased image layer or background layer, so as to distance the images or background layers from each other within the soap.

In embodiments in which one or more image layers or soap-encased image layers have been adhered to a base layer or background layer, a finish layer of additional molten soap can be poured or three-dimensionally printed onto the adhered image layers or soap-encased image layers and allowed to harden so as to provide a solid soap of the desired size and shape. In at least one embodiment, if the amount of soap encasing the soap-encased image layer is of sufficient thickness to form the present solid soap, it may not be necessary to adhere the soap-encased image to a base layer of solid soap, or to add a finish layer onto the soap-encased image layer.

In embodiments in which one or more image layers or soap-encased image layers or background layers are embedded between a base layer of soap and a finish layer of soap, the depths of the base layer and of the finish layer are chosen such that the resulting image or multi-layer image has the desired position when embedded within the final solid soap. In at least one embodiment, the depths of the base layer and the finish layer can be approximately one-half the desired depth of the final solid soap, so that the image can be positioned substantially in the middle of the final solid soap. In at least one alternative embodiment, the depths of the base layer and the finish layer can be less than or more than one-half the desired depth of the final solid soap, so that the embedded image can be closer to one face of the solid soap than to the opposite face.

In at least one embodiment, an image can be applied to a base layer of solid soap by printing the image directly onto the base layer of solid soap, or onto a background layer disposed on the base layer. In at least one embodiment, a dissolvable substrate as described herein can be applied or adhered to the base layer of soap, or onto a background layer disposed on the base layer, and an image can be printed on the surface of the dissolvable substrate. Molten soap can then be applied to the printed base layer so as to embed the image in the solid soap, as described herein. In at least one embodiment, the image can be printed using a flat-bed printer as known in the art adapted to use inks as described herein, and adapted to print on an object having at least the thickness of the base layer of solid soap and any background layers or adhered dissolvable substrate.

In at least one embodiment, the solid soap containing the embedded image can be formed as an individual bar or cake of soap in a mold, or can be cut to a desired size and shape. In at least one embodiment, the solid soap containing the embedded image can be formed as a sheet or slab of solid soap, which can be cut into individual bars or cakes of soap. In such embodiments, a number of individual image layers or soap-encased image layers may be embedded in the sheet or slab of solid soap, such that each individual bar or cake contains an image when cut from the sheet or slab.

The embodiments described herein are intended to be illustrative of the present compositions and methods and are not intended to limit the scope of the present invention. Various modifications and changes consistent with the description as a whole and which are readily apparent to the person of skill in the art are intended to be included. The appended claims should not be limited by the specific embodiments set forth in the examples, but should be given the broadest interpretation consistent with the description as a whole.

The invention claimed is:

1. A method of producing a solid soap containing at least one image embedded therein, the method comprising:
   printing a printed image on a printable edible icing sheet to form an image layer, wherein the printable edible icing sheet is printable at a print resolution of at least 150 dots per inch;
   bringing the image layer into contact with molten soap; and
   allowing the soap to harden so as to embed the image layer within the solid soap.

2. The method of claim 1 wherein the printed image is an image having a print resolution of at least 150 dots per inch.

3. The method of claim 1 wherein the printed image is a full color image having a print resolution of at least 150 dots per inch.

4. The method of claim 1 wherein the printed image is a three-dimensional image.

5. The method of claim 1 wherein the solid soap is selected from a slab, a sheet and an individual bar or cake.

6. The method of claim 1 wherein the solid soap further comprises one or more background layers.

7. The method of claim 1 wherein the at least one image comprises a plurality of images.

8. A method for using an image layer to produce a solid soap containing at least one image embedded therein, wherein the image layer is formed by printing a printed image on a printable edible icing sheet, wherein the printable edible icing sheet is printable at a print resolution of at least 150 dots per inch.

* * * * *